United States Patent [19]

de Roo

[11] 4,167,393

[45] Sep. 11, 1979

[54] METHOD FOR BINDING A WATER-SOLUBLE DIRECT DYE TO PAPER

[75] Inventor: Anthony M. de Roo, Sanford, Mich.

[73] Assignee: The Dow Chemical Company, Midland, Mich.

[21] Appl. No.: 935,426

[22] Filed: Aug. 21, 1978

[51] Int. Cl.² .................. D21H 1/46; D06P 1/52; C08G 73/02; C08G 73/04
[52] U.S. Cl. .................................. 8/7; 8/100 R; 8/31; 528/397; 528/422; 528/424; 106/22; 260/29.2 N
[58] Field of Search ............... 8/7, 100 R, 31, 17; 528/422, 397, 424; 162/162

[56] References Cited

U.S. PATENT DOCUMENTS

| | | | |
|---|---|---|---|
| 3,141,728 | 7/1964 | Bockmann et al. | 8/84 |
| 3,372,129 | 3/1968 | Phillips | 528/397 |
| 3,479,215 | 11/1969 | Cavagna et al. | 528/397 |
| 3,728,214 | 4/1973 | Espy | 528/424 |
| 3,778,225 | 12/1973 | Cuvelier et al. | 8/31 |
| 3,969,283 | 7/1976 | Timmerman et al. | 260/29.2 N |
| 4,087,413 | 5/1978 | Kelyman | 528/424 |

FOREIGN PATENT DOCUMENTS

| | | | |
|---|---|---|---|
| 686202 | 5/1964 | Canada | 8/7 |

*Primary Examiner*—Melvyn I. Marquis
*Assistant Examiner*—Maria S. Tungol
*Attorney, Agent, or Firm*—G. R. Plotecher

[57] ABSTRACT

The method of binding a water-soluble, direct dye to paper is improved by using as a binder the reaction product of a polyalkylene polyamine and a quaternary ammonium salt. For example, the direct dye Intralite ® Yellow 2RLSW manufactured by Crompton & Knowles bound to paper toweling by the reaction product of a polyethylenimine having a number average molecular weight of about 40,000 and 3-chloro-2-hydroxypropyl trimethylammonium chloride demonstrates improved bleed resistance under alkaline conditions than when bound to similar paper toweling by conventional binders, such as polyethylenimine or other cationic, nitrogen-containing polymers.

8 Claims, No Drawings

METHOD FOR BINDING A WATER-SOLUBLE DIRECT DYE TO PAPER

BACKGROUND OF THE INVENTION

1. Field of the Invention

This invention relates to an improved method for fixing a water-soluble, direct dye to paper.

2. Description of the Prior Art.

The paper industry currently recognizes a number of different binders (also known as fixatives or retention aids) useful for binding dyes and pigments to paper, particularly paper tissue and paper toweling. Of these binders, the polyalkylene polyamines, especially polyethylenimine, are generally considered excellent for binding a water-soluble, direct dye to paper. Although such direct dyes are tenaciously bound to paper, some bleeding of these dyes from the paper is usually observed under alkaline conditions, such as in the presence of common household cleaners.

Faessinger, U.S. Pat. No. 3,864,296, teaches an aqueous, low-viscosity, printing fluid, containing a water-soluble, cationic, thermosetting resin and a water-soluble dye which is compatible with the resin in solution. These printing fluids are taught to be useful in high-speed printing processes.

SUMMARY OF THE INVENTION

According to this invention, the bleed fastness of a water-soluble, direct dye bound to paper is improved by using as the binder the reaction product of a polyalkylene polyamine having a number average molecular weight between about 10,000 and about 100,000 and a quaternary ammonium salt of the formula

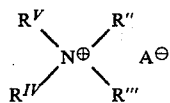  (I)

wherein $R''$–$R^{IV}$ are hydrocarbyl radicals of 1 to 3 carbon atoms, $R^V$ is a substituted hydrocarbyl radical of 3 to 5 carbon atoms with the substituents being a halogen and a hydroxyl group in adjacent carbon atoms, and $A^\ominus$ is a neutralizing anion.

DETAILED DESCRIPTION OF THE INVENTION

The binders used in the practice of this invention are the reaction products of a polyalkylene polyamine and a quaternary ammonium salt. Both branched and linear polyalkylene polyamines can be here used. The linear polyalkylene polyamines are known compounds consisting of n randomly joined units (II, III) and are readily prepared by the ring-opening polymerization of substituted oxazolines or like compounds (IV), followed by hydrolysis.

$$\{N-(CHR)_x-CH_2\} \quad (II)$$
$$\underset{\overset{\|}{O}}{\overset{|}{C}}-R'$$

$$\{N-(CHR)_x-CH_2\} \quad (III)$$
$$|$$
$$H$$

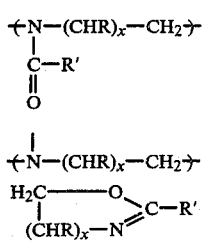  (IV)

The substituents and subscripts are later defined. The ring-opening polymerization is generally conducted in the presence of a cationic polymerization catalyst at a reaction temperature of about 0°–200° C. Typical catalysts include strong mineral acids, organic sulfonic acids and their esters, acidic salts such as ammonium sulfate, Lewis acids such as aluminum trichloride, stannous tetrachloride, boron trifluoride, and organic diazonium fluoroborates, dialkyl sulfates, and other like catalysts. This ring-opening polymerization is further described by Tomalia et al., J. Polymer Science, 4, 2253 (1956); Bassiri et al., Polymer Letters, 5, 871 (1967); and Seeliger, Ger. Pat. 1,206,585.

The prehydrolyzed polymers thereby obtained are linear, N-acylated polyalkylene polyamines having a molecular structure consisting essentially of n repeating units II. These polymers are easily deacylated by acid, base or neutral hydrolysis. Hydrolysis (deacylation) is best controlled under acidic conditions and acid hydrolysis is thus preferred. The partially deacylated polyalkylene polyamines have a molecular structure consisting essentially of the randomly joined units II and III, illustratively depicted as

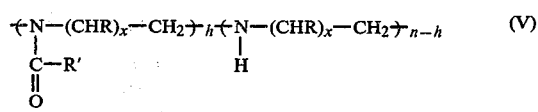  (V)

wherein n is the total number of units; h is the number of acylated units; and n-h is the number of deacylated units.

"Acylated polyalkylene polyamines" here includes both the fully and partially deacylated polymers. Partially deacylated polyalkylene polyamines have at least one secondary amine group

per polymer chain as in V where n-h is at least one. Preferably, the polyalkylene polyamines here used are at least about 50 percent deacylated (n-h is at least about 50 percent of n) and more preferably at least about 90 percent deacylated (n-h is at least about 90 percent of n). Fully deacylated polyalkylene polyamines (n-h is or is about 100 percent of n) are most preferred.

The branched polyalkylene polyamines (VI) include those obtained from reacting an alkylene polyamine (e.g., ethylene diamine, 1,2-propylene diamine, ethylene triamine, tetraethylene pentaamine, etc.) with a difunctional, chain-extended and cross-linking agent (e.g., 1,2-dichloroethane, epichlorohydrin, etc.).

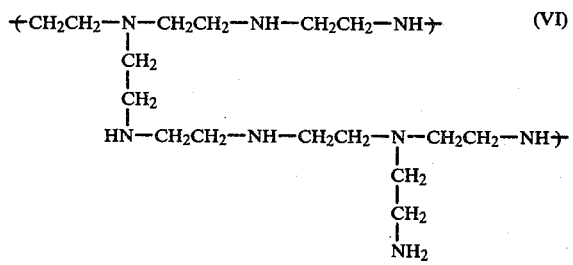  (VI)

Of course, acylated polyalkylene polyamines are not generated by these preparations and the branched polyalkylene polyamines are thus without acyl groups, or in the language of linear polyalkylene polyamines, they are fully deacylated. Also included within the term "branched polyalkylene polyamine" is polyethylenimine, generally produced by the polymerization of ethylenimine in the presence of an acid catalyst, the corresponding propylenimines, and the like. Polyethylene polyamines, especially the polyethylenimines, are preferred for reasons of commercial availability.

As regards the previously undefined substituents and subscripts in the above formulae, R is typically hydrogen or $C_1$–$C_3$ alkyl, R' is typically hydrogen or alkyl having up to about 18 carbon atoms or an inertly-substituted derivative thereof, and x is one or two. By such terms as "inertly-substituted" is meant that the substituents do not preclude either the reaction of the polyalkylene polyamine with a quaternary ammonium salt or the improved bleed fastness characteristics of the reaction product of the polyalkylene polyamine and quaternary ammonium salt. Illustrative inert substituents include halogen, ethylenic unsaturation, ether oxygen, carbonyl, ester, etc. Exemplary R substituents include hydrogen, methyl, ethyl and propyl and exemplary R' substituents (alkyl) include methyl, ethyl, propyl, pentyl, cyclohexyl, dodecyl, octadecyl, and various halogenated, ethylenically unsaturated, etc. derivatives of each. Fully deacylated polyethylenimines (x is one) wherein R is hydrogen are the preferred linear polyalkylene polyamines. Branched polyethylenimines are most preferred.

Polyalkylene polyamines having a number average molecular weight of at least about 10,000, as determined by gel permeation chromatography, are used in the practice of this invention. Typically these compounds have an average number molecular weight of at least about 20,000 and preferably of about 40,000. Practical considerations, such as preparation, mechanical application, and the like, are the only limitations upon the average maximum molecular weight of these compounds although a maximum of about 100,000, and preferably of about 60,000, is preferred for reasons of convenience.

The quaternary ammonium salts, I, used in the practice of this invention are also known compounds. $R''$–$R^{IV}$ are hydrocarbyl radicals of 1 to 3 carbon atoms but are preferably methyl radicals. $R^V$ is a substituted hydrocarbyl radical of 3 to 5 carbon atoms, the substituents being halogen and hydroxyl radicals. The halogen radical, typically chlorine, and the hydroxyl radical are located on adjacent carbon atoms, typically on the two carbon atoms most removed from the quaternized nitrogen atom. The neutralizing anion, $A\ominus$, may be varied to convenience. Chloride and bromide are the preferred anions but other representative anions include fluoride, iodide, tosylate, acetate, bisulfate, etc.

Illustrative quaternary ammonium salts here used include: 3-chloro-2-hydroxypropyl trimethylammonium chloride, 3-chloro-2-hydroxypropyl triethylammonium bromide, 4-chloro-3-hydroxybutyl tripropylammonium bisulfate, 2-chloro-1-dydroxypropyl dimethylethylammonium chloride, 3-chloro-2-hydroxypropyl methylethylpropylammonium chloride, 3-hydroxy-2-chloropropyl methyldiethylammonium bisulfate, and the like. 3-Chloro-2-hydroxypropyl trimethylammonium chloride is the preferred quaternary ammonium salt.

The binders of this invention are prepared by reacting a polyalkylene polyamine and a quaternary ammonium salt. The reaction is formed by contacting between about 0.1, preferably 0.25, and about 0.75 equivalent weights of the quaternary ammonium salt with the polyalkylene polyamine in the presence of about a stoichiometric amount, based on the amount of quaternary ammonium salt, of an alkali or alkaline earth metal hydroxide at a temperature between about 20° C. and about 80° C., preferably between about 40° C. and about 60° C. Another manner of expressing the proportion of polyalkylene polyamine and quaternary ammonium salt contacted to obtain the binder of this invention is that the salt:mer unit ratio here used is between about 1:10 and about 3:4. A "mer" unit is one reacted monomer unit within the polymer, e.g., a mer unit of polyethylenimine is III where R is H and x is 1.

Any suitable alkali or alkaline earth metal hydroxide can be here used but sodium hydroxide is preferred for reasons of convenience. By "stoichiometric amount" is meant that for each mole of quaternary ammonium salt used, about one mole of alkali or alkaline earth metal hydroxide is also used. Excess hydroxide can be employed if desired.

The reaction is conducted in an aqueous medium and is fast and efficient and generally proceeds to completion within minutes.

The resulting reaction product is thus a polyalkylene polyamine with 10, and preferably 25 or 50, percent to 75 percent of its primary and secondary amine functionalities now bearing pendant quaternary ammonium salts. Preferred reaction products are water-soluble solids and are generally characterized by a basic pH (~8 or 9) and a specific gravity of about 1.1 to about 1.2.

The water-soluble, direct dyes here used are dyes that do not react with the cellulosic fiber of the paper but rather are physically absorbed into the fiber structure. These differ from reactive dyes in that these latter dyes all contain some reactive group capable of forming covalent bonds with the cellulosic fiber. Direct dyes are generally linear azo and polyazo dyes, but dioxazine, phthalocyanine and other structures are also known. The common features of these dyes are good water solubility, relatively high molecular weight and fiber affinity, i.e., they transfer directly (hence their name) from an aqueous solution to a cellulosic medium. These dyes are available in a full spectrum of shades varying from dull to relatively bright. Because direct dyes are principally physically bound into the cellulosic fiber, these dyes generally do not demonstrate good wash and white fastness as compared to reactive dyes. Accordingly, these dyes are generally used in combination with a cationic agent which forms a water-soluble complex with the dye. Representative direct dyes include: Fastusol ® Blue 9 GLP manufactured by GAF, Intralite ® Turquoise GLL manufactured by Crompton & Knowles, Sirius ® Supra Yellow manufactured by Verona Dyestuffs, Brilliant Bond Blue manufactured by E.I. du Pont de Nemours and Company, etc. Direct dyes and their characteristics are further described in Colour Index, II, 3rd Ed. (London, 1971) by The Society of Dyers and Colourists.

The binders of this invention are used in the same manner as known binders, particularly the polyethylenimines. In one embodiment of this invention, the binders and dyes are formulated into an ink composition under neutral or mildly alkaline conditions in the presence of a small amount of anionic dispersant. These ink compositions quite often contain sodium chloride or some other similar salt to increase the retention of the direct dye to unsized paper.

Two preferred methods of formulating the binders of this invention and water-soluble, direct dyes into ink compositions comprise either adding the dye directly to the remainder of the formulation or adding the dye to water with sufficient agitation to dissolve the dye and then adding this mixture to the rest of the formulation. These methods promote dispersion and discourage formulation thickening.

Where several different dyes are used in the same formulation or where the dye will chemically interact with the binder, manipulation of the pH is useful. Generally, certain other dyes can be dissolved only at a relatively high pH while others dissolve better at a lower pH. Under such conditions, first dissolving the dye that is soluble at the higher pH and then lowering the pH with an acid, such as acetic or citric, to dissolve the remaining dyes is helpful.

The amount of binder used in a typical ink formulation will vary with the substrate to be printed and the reactive dyes. However, these binders are typically used, based upon the weight of the ink formulation, in an amount of about 0.5 to about 15 percent and preferably of about 2 to about 8 percent. "Paper" as here used includes conventional paper as well as paper products, such as paper tissue and paper toweling.

The hallmark of this invention is the improved resistance to bleeding of a water-soluble, direct dye from paper under alkaline conditions. Specifically, in one embodiment paper tissue and paper toweling printed with ink formulations containing water-soluble, direct dyes and the binders of this invention demonstrate better bleed fastness when used in conjunction with strong, alkaline household cleaners than paper tissue and paper toweling printed with ink formulations containing water-soluble, direct dyes and a polyethylenimine binder when used under similar conditions.

The following examples are illustrative of certain, illustrative embodiments of this invention. Unless noted to the contrary, all parts and percentages are by weight.

SPECIFIC EMBODIMENTS

Polyalkylene Polyamine Preparation:

A branched polyalkylene polyamine having a number average molecular weight of about 40,000 was prepared by contacting ethylene diamine oligomers and ethylene dichloride at a temperature of about 80° C.

Quaternary Ammonium Salt:

3-Chloro-2-hydroxypropyl trimethylammonium chloride was the quaternary ammonium salt here used.

Binder Preparation:

Four binders were prepared. The first binder was prepared by contacting an aliquot of the polyalkylene polyamine prepared above with 0.1 equivalent weight of 3-chloro-2-hydroxypropyl trimethylammonium chloride in the presence of a stoichiometric amount, based on the amount of quaternary ammonium salt, or sodium hydroxide. The second, third and fourth binders were prepared in a similar manner except 0.25, 0.5 and 0.75 equivalent weights of the quaternary ammonium salt were substituted for the 0.1 equivalent weight, respectively.

Control Binder:

PEI 600, a polyethylenimine having a number average molecular weight of about 40,000 and marketed by The Dow Chemical Company, was used as a control. PEI 600 is a known binder useful in binding water-soluble, direct dyes to paper.

Ink Formulation:

Binder (14 parts); triethanolamine, a viscosity and fugitive aid (9 parts); triethylene glycol, a humectant (9 parts); Dowanol® EB glycol ether, a wetting aid, (6 parts, a glycol ether manufactured by The Dow Chemical Company); water (57 parts); and a green dye consisting of Intralite® Yellow 2RLSW (2 parts) manufactured by Crompton & Knowles; Levafix® Brilliant Yellow E3RL (1.7 parts) manufactured by Verona Dyestuffs; and Paperfast® Turquoise GP (1.3 parts) also manufactured by Verona Dyestuffs, were mixed together, the pH was adjusted with potassium hydroxide to 8.5–9.5, and then the mixture was vigorously agitated on a shaker. The dye was the last ingredient added to the formulation.

Paper:

Commercially available kitchen toweling was used.

Printing Procedure:

Test strips (2 inches by 3 ½ inches) of kitchen toweling were printed with the ink formulation by means of a Parmaco® hand proofer, an offset-gravure roller containing 165 lines per inch. The printed toweling was then aged for a minimum of 48 hours at room temperature.

Alkalinity Bleed Test:

Fantastik®, a strong alkaline household spray cleaner manufactured by Texize Chemicals Company, was used. A nonprinted paper towel was placed upon the top of the test strips, sprayed with Fantastik® and subsequently visually checked for bleeding. The results of these tests are reported in the table.

| Example | ALKALINITY BLEED TESTS | | |
|---|---|---|---|
| | Binder in Ink Formulation | Bleed Rating | Comments |
| 1 | PAPA and 0.1 eq. wt. Quat. | 2–3 | yellow only |
| 2 | PAPA and 0.25 eq. wt. Quat. | 1–2 | yellow only |
| 3 | PAPA and 0.50 eq. wt. Quat. | 1 | yellow only |
| 4 | PAPA and 0.75 eq. wt. Quat. | 1 | yellow only |
| Control | PEI 600 | 3 | yellow only |

*color of the bleed.

Bleed Rating:

A scale of 0–5 was used when visually checking the test strips. The numerical values corresponded to the following observations:
0=no bleeding
1=barely
2=noticeable
3=bleeding
4=moderate bleeding
5=severe bleeding This rating scale is based on the intensity of the color removed when compared with the intensity of the original colored area. A similar rating scale is more fully described and illustrated in U.S. Pat. No. 3,864,296.

Remarks:

The data of the above table demonstrates that the binders of this invention outperform the generally acknowledged leading binder of the prior art, i.e., the binders of this invention show enhanced dye retention characteristics as compared to PEI 600.

Although the invention has been described in considerable detail as regards the preceding specific embodiments, such detail is for the purpose of illustration only and many variations and modifications can be made by one skilled in the art without departing from the spirit and scope of the appended claims.

What is claimed is:

1. In a method of binding a water-soluble, direct dye to paper using a binder, the improvement wherein the binder is the reaction product of a polyalkylene polyamine having a number average molecular weight of at least about 10,000 and between about 0.1 and about 0.75 equivalent weights of a quaternary ammonium salt of the formula

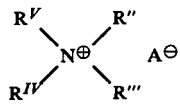

wherein $R''-R^{IV}$ are hydrocarbyl radicals of 1 to 3 carbon atoms, $R^V$ is a substituted hydrocarbyl of 3 to 5 carbon atoms with the substituents being a halogen and a hydroxyl group on adjacent carbon atoms, and $A^\ominus$ is a neutralizing anion.

2. The method of claim 1 wherein the number average molecular weight of the polyalkylene polyamine is at least about 20,000.

3. The method of claim 1 wherein the number average molecular weight of the polyalkylene polyamine is between about 40,000 and about 60,000.

4. The method of claim 3 wherein the polyalkylene polyamine is branched.

5. The method of claim 4 wherein the polyalkylene polyamine is the reaction product of ethylene diamine oligomers and ethylene dichloride.

6. The method of claim 5 wherein the quaternary ammonium salt is 3-chloro-2-hydroxypropyl trimethylammonium chloride.

7. The method of claim 6 wherein the polyalkylene polyamine and quaternary ammonium salt are contacted at a temperature between about 20° C. and about 80° C.

8. The method of claim 7 wherein between about 0.25 and about 0.75 equivalent weights of the quaternary ammonium salt is reacted with the polyalkylene polyamine.

* * * * *